June 6, 1933.  M. E. CARBONEL  1,913,189
WHIPPER AND DISPENSER
Filed April 5, 1932
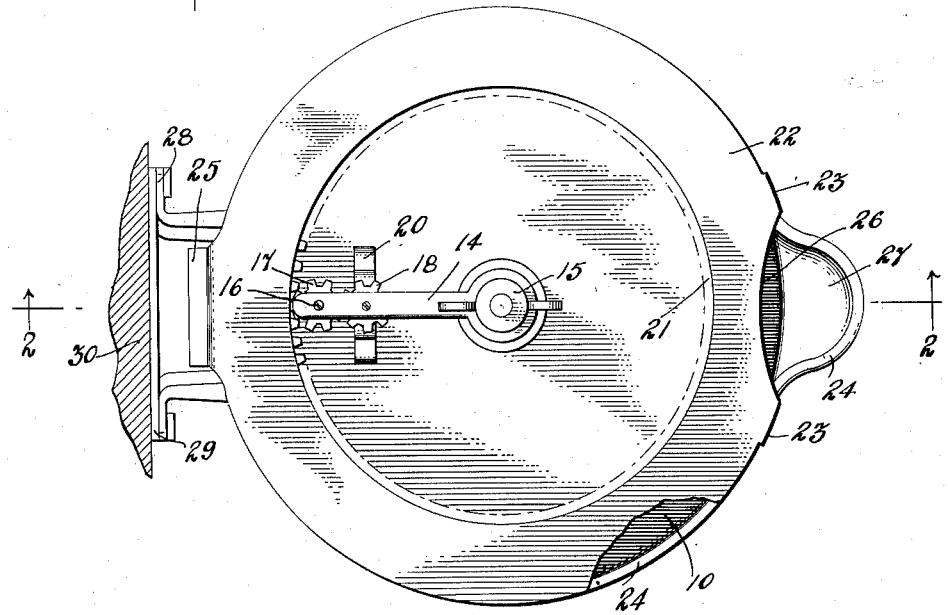
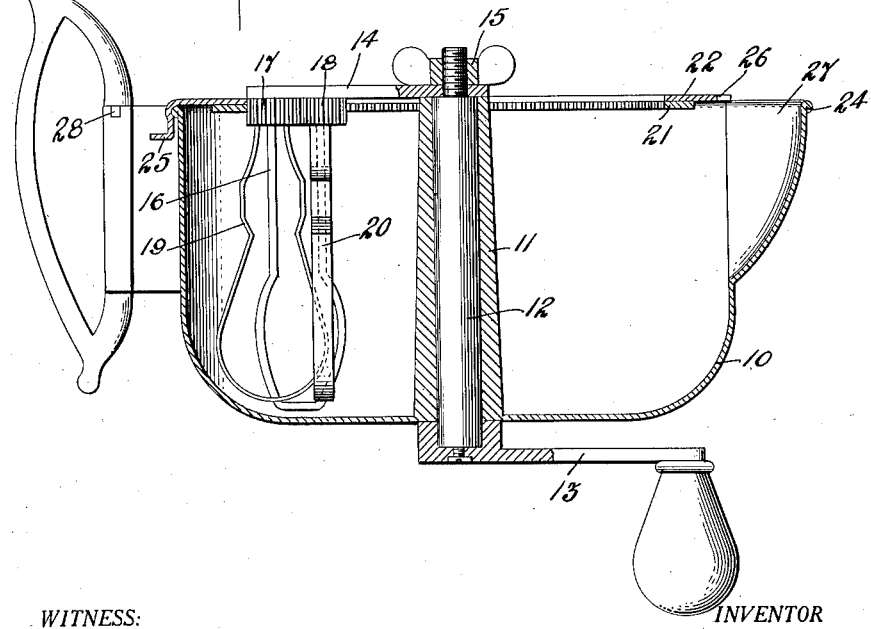
WITNESS:
O. H. Cook
Irma O. Brown
INVENTOR
Mariano E. Carbonel
BY
Joshua R. H. Potts
HIS ATTORNEY Patented June 6, 1933

1,913,189

UNITED STATES PATENT OFFICE

MARIANO E. CARBONEL, OF PHILADELPHIA, PENNSYLVANIA

WHIPPER AND DISPENSER

Application filed April 5, 1932. Serial No. 603,249.

This invention relates to whipping and dispensing devices, and has for an object to provide a device in which material may be whipped and later dispensed from the same container.

It is well known that certain materials which are whipped, as for instance cream, is later dispensed at the table, and the present invention is directed to the producing of a receptacle which shall operate both as receptacles for containing the materials while being whipped, and later for dispensing the same at the table or elsewhere.

A further object of the invention is to provide a container in the form of a pitcher having a pouring lip, with a circular rack removably placed thereon and about which circular rack moves a beating implement rotated by mechanisms which are later removed from the container together with the rack and beater, leaving the container in the form of a pitcher for dispensing.

A further object of the invention is to provide in combination with a container, an improved type of circular rack for snapping and fastening thereon, and for coaction with a beater implement having planetary movement within the circular rack.

The invention, therefore, comprises a container having centrally thereof an upstanding boss of a height corresponding to the height of the container, through which is extended a shaft, with an arm extending laterally from the shaft and secured thereon by any form of securing means, with intergeared pinions journaled upon the arm carrying each its beater unit and in engagement with a rack which is replaceably carried upon the upper edge of the container so that as the beater organization rotates, its units have a planetary movement and all removable to provide a dispenser or pitcher.

The drawing illustrates an embodiment of the invention and the views therein are as follows:

Figure 1 is a view of the device in top plan, and

Figure 2 is a sectional view taken on line 2—2 of Figure 1.

Like characters of reference indicate corresponding parts throughout the several views.

A container 10 is provided in carrying out the present invention which may be of any approved shape, and is provided with an upstanding boss or sleeve 11 centrally therein. Within this boss or sleeve 11 a shaft 12 is journaled to be rotated by means of a crank arm 13 disposed beneath the container 10.

Upon the upper end of the shaft 12, an arm 14 is secured by any approved means as the winged nut 15. This arm 14 is provided with a U-shaped bow of wire or the like 16, extending downwardly therefrom approximately to the bottom of the container.

Upon the upper ends of the legs of this U-shaped wire, pinions 17 and 18 are journaled. The pinions 17 and 18 carry beater units 19 and 20 which in form correspond substantially to types of beaters already known.

Upon the top or upper edge of the container 10, a circular rack 21 is removably secured. This is brought about by a plate 22 rigidly secured to the rack 21, and having ears 23 which snap over the rolled or thickened edge 24 of the container, and with a lip 25 which snaps over the rolled edge at a point opposite the lip. This plate 22 is cut out at 26 to form an opening adjacent to the pouring lip 27.

At the side opposite the pouring lip 27, the container is provided with outwardly turned flanges 28 which engage a bracket 29 adapted to be secured to a wall or other support, indicated at 30. While the material is being whipped, the container will, therefore, preferably be supported in this bracket for rigidity of the container, and hold it against turning or movement. When the whipping has been completed, the container will be removed from the bracket and a handle 31, having parts corresponding to the parts for engaging the flanges 28, will be substituted so that the container then will assume certain portions of a dispensing pitcher.

The shaft 12 is removed by the removal of the nut 16 which releases the arm 14 so that the beater organization may be removed.

The removal of the rack 21 and plate 22 will complete the relieving of the container of all working parts, and with the handle attached, it then becomes a pitcher-like container for dispensing the contents at the table or elsewhere.

Of course, the whipper and dispenser, herein illustrated, may be modified and changed in various ways without departing from the invention herein set forth and hereinafter claimed.

The invention is hereby claimed as follows:

1. A whipper and dispenser comprising a container having a sleeve upstanding centrally therein, a continuous shaft journaled within the sleeve and extending therewithout at both ends, an arm fitted upon the shaft, means coupling the arm and shaft to maintain the arm against rotation relative to the shaft and the shaft in journaled position, a whipper organization carried by the arm, said organization including intergeared pinions, and a circular rack placed upon the container and intergeared with one of said pinions, said shaft, whipper organization and rack being independently removable from the container.

2. A whipper and dispenser comprising a container having a pouring lip, a rack removably placed upon the container and having a cut-out part coacting with the pouring lip, a continuous shaft journaled centrally of the container, an arm extending radially from the shaft, whipper elements carried by the shaft and receiving planetary motion from the rack, and means to apply rotary motion to the shaft.

3. A whipper and dispenser comprising a container for dispensing having a rolled upper edge, a circular rack having latch means for engagement with the rolled edge of the container with the rack lying within the lines of the container, a sleeve upstanding in the container centrally of the rack, a shaft journaled in the sleeve, an arm carried by the shaft and bearing upon the top of the sleeve and extending radially therefrom, whipper elements carried by the shaft and receiving planetary motion from the rack, and means for disconnecting the arm, the shaft and the rack from the container.

4. A whipper and dispenser comprising a circular container having spaced flanges outstanding from one side and a pouring lip from the opposite side, a cover member for the container, said cover comprising upon one side means to snap over the edge of the container between the flanges and upon the opposite side spaced means for snapping over the edge of the container upon opposite sides of the pouring lip to maintain said annulus in position, a rack upon the interior edge of the annulus, and a whipper element receiving planetary motion from said rack.

In testimony whereof I have signed my name to this specification.

MARIANO E. CARBONEL.